(12) United States Patent
Becker et al.

(10) Patent No.: US 12,110,184 B2
(45) Date of Patent: Oct. 8, 2024

(54) BLOCK STACKING ARRANGEMENT

(71) Applicant: Jungheinrich Aktiengesellschaft, Hamburg (DE)

(72) Inventors: Michael Becker, Hainburg (DE); Timm Morawietz, Tholey-Überroth (DE); Anatolij Alberg, Pfungstadt (DE); Marc Gerhardt, Hünfeld (DE)

(73) Assignee: Jungheinrich Aktiengesellsch, Hamburg (DE)

( * ) Notice: Subject to any disclaimer, the term of this patent is extended or adjusted under 35 U.S.C. 154(b) by 99 days.

(21) Appl. No.: 18/115,930

(22) Filed: Mar. 1, 2023

(65) Prior Publication Data

US 2023/0278801 A1 Sep. 7, 2023

(30) Foreign Application Priority Data

Mar. 3, 2022 (EP) ..................................... 22159994

(51) Int. Cl.
*B65G 1/14* (2006.01)
*F16B 7/04* (2006.01)
(Continued)

(52) U.S. Cl.
CPC .............. *B65G 1/14* (2013.01); *F16B 7/0486* (2013.01); *A47B 87/0246* (2013.01);
(Continued)

(58) Field of Classification Search
CPC .............. F16B 7/0486; A47B 87/0261; A47B 87/0246; A47B 57/08; A47B 57/10;
(Continued)

(56) References Cited

U.S. PATENT DOCUMENTS 3,231,103 A * 1/1966 Tantlinger ................ B65G 1/14
211/49.1
6,481,177 B1 * 11/2002 Wood ...................... F16B 12/50
403/231
(Continued)

FOREIGN PATENT DOCUMENTS

| DE | 198 49 391 | 5/2000 |
|---|---|---|
| DE | 10 2016 125 786 | 6/2018 |
| EP | 3 782 930 | 2/2021 |

OTHER PUBLICATIONS

Europe Search Report conducted in counterpart Appln. No. 22159994.7 (Sep. 14, 2022).

*Primary Examiner* — Devin K Barnett
(74) *Attorney, Agent, or Firm* — GREENBLUM & BERNSTEIN, P.L.C.

(57) ABSTRACT

Block stacking arrangement that includes a plurality of container receiving slots, a loading space arranged below the container receiving slots in a direction of gravity, a pass-through opening between respective container receiving slots and the loading space, and a holding device, which is arranged in the pass-through opening, having a flap pivotable about a shaft between a holding position and a release position. The shaft is mounted in an edge of the pass-through opening, and the shaft is mounted at at least one end in a bolt socket that is upwardly open in the direction of gravity. The block stacking arrangement further includes a shaft hold-down device, which is fastened to the edge of the pass-through opening, arranged at least partially above the bolt socket in the direction of gravity to act on the end of the shaft.

14 Claims, 3 Drawing Sheets

(51) Int. Cl.
　　　*A47B 87/02*　　　(2006.01)
　　　*B65G 1/02*　　　(2006.01)
　　　*B65G 1/04*　　　(2006.01)

(52) U.S. Cl.
　　　CPC ............ *A47B 87/0261* (2013.01); *B65G 1/02* (2013.01); *B65G 1/0471* (2013.01)

(58) Field of Classification Search
　　　CPC ......... A47B 57/18; A47B 57/32; A47B 57/34; A47B 57/44; A47B 57/06; A47B 47/027; A47B 47/028; A47B 47/045; A47B 47/0083; A47B 47/058; A47B 47/00; B65G 1/14; B65G 1/02; B65G 1/0471; B65G 57/302; B65G 57/30; B65G 57/02; B65G 59/063; B65G 59/062; B65F 1/0471
　　　See application file for complete search history.

(56) References Cited

U.S. PATENT DOCUMENTS

| | | | | |
|---|---|---|---|---|
| 6,663,148 | B2* | 12/2003 | Bonora | H01L 21/67373 |
| | | | | 292/159 |
| 10,336,540 | B2* | 7/2019 | Gravelle | B65G 1/04 |
| 11,235,927 | B2* | 2/2022 | Hognaland | B65G 1/0478 |
| 11,261,026 | B2* | 3/2022 | Cavelius | B65G 57/02 |
| 2003/0206789 | A1* | 11/2003 | Tai | B65G 1/0414 |
| | | | | 414/275 |
| 2014/0308107 | A1* | 10/2014 | Nickles | B65G 57/302 |
| | | | | 29/418 |
| 2016/0245320 | A1* | 8/2016 | Oetlinger | E05D 5/0238 |
| 2019/0375590 | A1* | 12/2019 | Gravelle | B65G 1/04 |
| 2021/0052070 | A1* | 2/2021 | Cavelius | B65G 1/0471 |
| 2021/0052071 | A1* | 2/2021 | Cavelius | B65G 1/0471 |
| 2021/0053777 | A1 | 2/2021 | Harting et al. | |
| 2021/0188546 | A1* | 6/2021 | Becker | B65G 59/063 |
| 2022/0063916 | A1* | 3/2022 | Becker | B65G 1/0471 |
| 2023/0278788 | A1* | 9/2023 | Becker | B65G 1/0471 |
| 2023/0278790 | A1* | 9/2023 | Becker | F16B 7/0486 |
| | | | | 211/182 |

* cited by examiner

BLOCK STACKING ARRANGEMENT

CROSS-REFERENCE TO RELATED APPLICATION

This application claims priority under 35 U.S.C. § 119 (a) to Europe Application No. 22 15 9994.7 filed Mar. 3, 2022, the disclosure of which is expressly incorporated by reference herein in its entirety.

BACKGROUND

1. Field of the Invention

The present invention relates to a block stacking arrangement that includes a plurality of container stacking slots, and a loading space arranged below the container stacking slots in the direction of gravity. In each case, a pass-through opening is located between the container stacking slots and the loading space, and a holding device is arranged in the pass-through opening. The holding device has a flap that can be pivoted about a shaft between a holding position and a release position, and the shaft is mounted in the edge of the pass-through opening.

2. Discussion of Background Information

Such a block stacking arrangement is known, for example, from EP 3 782 930 A1.

A block stacking arrangement, also referred to as a "stacking storage arrangement," is used for accommodating a large number of containers in a relatively small space. In this case, the containers are accommodated in the form of stacks such that they can be arranged closely one above the other in the direction of gravity. The container stacks can be arranged in the container stacking slots. The container stacking slots can likewise be arranged close to one another in a plane perpendicular to the direction of gravity such that the available installation space is utilized relatively well.

In the present case, the container stacking slots are loaded from below in the direction of gravity, i.e., a container is introduced into a container stacking slot from below and is also removed downwardly from the container stacking slot.

For this purpose, a loading vehicle is used that can be moved within the loading space. To place a container in a container stacking slot, the loading vehicle with the container located thereon is moved to a position below the desired container stacking slot. The container is then lifted by the loading vehicle until it has passed the holding device. When the container is then lowered again by the loading vehicle, the container will be held in the holding device. If one or more containers have already been found in the container slot in question, the newly stored container then becomes the lowest container of a container stack.

The loading vehicle is also used to remove a container from the container stacking slot. The loading vehicle is positioned below the container stacking slot and a lifting device of the loading vehicle is raised until it can lift the lowest container. The container, optionally with further containers located thereupon, is lifted until it is released from the holding device. The holding device is then moved into a release position and the container can be lowered. During the lowering process, the holding device is activated again such that the previously penultimate container is held by the holding device. If a plurality of containers are to be removed from the container stacking slot at once, the holding device can also be activated only after the desired number of containers have been removed from the container stacking slot.

To hold a container, the holding device has one or more flaps that can be pivoted between a holding position and a release position. For pivoting, the flap has a shaft mounted on the edge of the pass-through opening.

In the event of damage, the flap must be easy to replace.

SUMMARY

Embodiments are directed to a block stacking arrangement that is easy to maintain.

According to embodiments, a block stacking arrangement of the type mentioned at the outset includes the shaft being mounted at at least one end in a bolt socket that is upwardly open in the direction of gravity. A shaft hold-down device is fastened to the edge of the pass-through opening, which shaft hold-down device is arranged at least partially above the bolt socket in the direction of gravity and acts on the end of the shaft.

In this embodiment, the flap can be replaced relatively easily or maintenance work can be easily performed on the flap, for which the flap must be easily accessible overall. For this purpose, only the shaft hold-down device needs to be removed from the pass-through opening and the shaft of the flap can then be removed upwardly from the bolt socket in the direction of gravity. During operation, however, the shaft is held in the bolt socket by the shaft hold-down device such that a force acting on the flap from below will not cause the flap to leave its predetermined position.

Preferably, the flap is arranged in a corner of the pass-through opening between a longitudinal side and a transverse side, and the shaft hold-down device is connected both to the longitudinal side and to the transverse side. As a result, the shaft hold-down device is secured in a simple manner against tilting, without the need for an excessive effort for connecting the shaft hold-down device to the edge of the pass-through opening.

Preferably, the shaft hold-down device is connected to the edge of the pass-through opening with the aid of screws. For example, four screws can be provided, of which two are fastened in the longitudinal side and two in the transverse side. The use of screws is a relatively simple measure.

For each of the screws, the shaft hold-down device preferably has a screw boss facing the edge of the pass-through opening. A screw boss allows a screwed connection without tensioning the respective parts, even in the case of elements forming the edge of the pass-through opening being subject to tolerances. The risk of the shaft hold-down device being deformed in an undesired manner is thereby kept low.

Preferably, the flap is pretensioned by a spring into the holding position. By the use of the shaft hold-down device, a greater pretensioning force can be used. The spring also occasionally tends to push the shaft of the flap out of the bolt socket. This is reliably prevented by the shaft hold-down device.

In this case, it is preferred that the spring be designed as a coil spring arranged on the end of the shaft. This is a relatively simple way of positioning the spring accordingly.

Preferably, the pass-through opening has a positioning profile and the shaft hold-down device has a matching counter-profile. This makes it easy to position the shaft hold-down device in the pass-through opening at a desired position with high repeat accuracy.

Preferably, the shaft hold-down device is designed as a plastic element. The shaft hold-down device can be designed, for example, as an injection-molded part. The shaft hold-down device is thus relatively inexpensive.

Preferably, the shaft hold-down device has an insertion bevel at its lower end in the direction of gravity. This makes it easier to insert a container from below through the pass-through opening and into the container stacking slot. The insertion bevel is then able to compensate for small inaccuracies in the positioning of the charging vehicle below the container stacking slot.

Preferably, the pass-through opening is formed in a frame arranged between the container stacking slots and the loading space, wherein the shaft is mounted in the frame. The frame thus carries the weight of the container stacks in the container stacking slots. The frame can also be used to install posts that are arranged between container stacking slots and which form a kind of tilting protection for the container stacks. The use of a frame makes it possible to position the pass-through opening in relation to the respective container stacking slots with little effort and to secure the shape of the pass-through openings with high accuracy.

In the direction of gravity, the shaft hold-down device preferably has an extension with which it overlaps the frame in the direction of gravity. A container stored in or removed from a container stacking slot then does not come into contact with the frame. The frame can thus be designed exclusively for mechanical stability.

Preferably, the shaft hold-down device has a recess in which the flap is received in the release position. When the flap is in the release position, it does not project beyond the shaft hold-down device such that in this way the shaft hold-down device forms a smooth surface with respect to the container and the container and flap are prevented from catching. It is particularly preferred that the flap terminates in the release position with the side of the shaft hold-down device facing the pass-through opening.

Preferably, the shaft hold-down device forms a sliding surface on its side facing the pass-through opening. The sliding surface is smooth, which is relatively easy to achieve when a plastic part is used. The sliding surface makes it easy for a container to slide along the shaft hold-down device.

Preferably, the frame has longitudinal members and cross-members, which are connected to one another by angle elements, wherein the shaft hold-down device is fastened to an angle element and the shaft hold-down device projects beyond the angle element in the direction of the longitudinal member and/or cross-member fastened to the angle element. The shaft hold-down device thus simultaneously forms a positioning aid for the longitudinal member and/or the cross-member. If a longitudinal member and/or a cross-member is fastened to the angle element, and a shaft hold-down device is arranged at both ends of the longitudinal member and/or the cross-member, the two shaft hold-down devices will then form a groove into which the longitudinal member or the cross-member can be inserted.

Embodiments are directed to a block stacking arrangement that includes a plurality of container receiving slots, a loading space arranged below the container receiving slots in a direction of gravity, a pass-through opening between respective container receiving slots and the loading space, and a holding device, which is arranged in the pass-through opening, having a flap pivotable about a shaft between a holding position and a release position. The shaft is mounted in an edge of the pass-through opening, and the shaft is mounted at at least one end in a bolt socket that is upwardly open in the direction of gravity. The block storage arrangement further includes a shaft hold-down device, which is fastened to the edge of the pass-through opening, arranged at least partially above the bolt socket in the direction of gravity to act on the end of the shaft.

According to embodiments, the edge of the pass-through opening in which the flap is mounted can be in a corner of the pass-through opening between a longitudinal side and a transverse side of the pass-through opening, and the shaft hold-down device may be connected both to the longitudinal side and to the transverse side. The shaft hold-down device may be connected to the edge of the pass-through opening by screws. Further, the shaft hold-down device can have a screw boss facing the edge of the pass-through opening for each of the screws.

In accordance with embodiments, the flap can be pretensioned into the holding position by a spring. Further, the spring may be designed as a coil spring arranged on the end of the shaft.

In embodiments, the pass-through opening may have a positioning profile and the shaft hold-down device may have a matching counter-profile.

In other embodiments, the shaft hold-down device can be designed as a plastic element.

According to other embodiments, the shaft hold-down device can have an insertion bevel at its lower end in the direction of gravity.

In accordance with still other embodiments, the pass-through opening may be formed in a frame arranged between the container receiving slots and the loading space, wherein the shaft is mounted in the frame. The shaft hold-down device may have an extension in the direction of gravity with which it covers the frame in the direction of gravity. Further, the shaft hold-down device can have a recess in which the flap is received in the release position. The shaft hold-down device may form a sliding surface on its side facing the pass-through opening.

In accordance with still yet other embodiments, the frame may have longitudinal members and cross-members, which are connected to one another by angle elements, the shaft hold-down device can be fastened to one of the angle elements and the shaft hold-down device can project beyond the angle element in the direction of at least one of the longitudinal member or the cross-member fastened to the angle element.

Other exemplary embodiments and advantages of the present invention may be ascertained by reviewing the present disclosure and the accompanying drawing.

BRIEF DESCRIPTION OF THE DRAWINGS

The invention is described below with reference to a preferred exemplary embodiment in conjunction with the drawing. The following are shown therein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
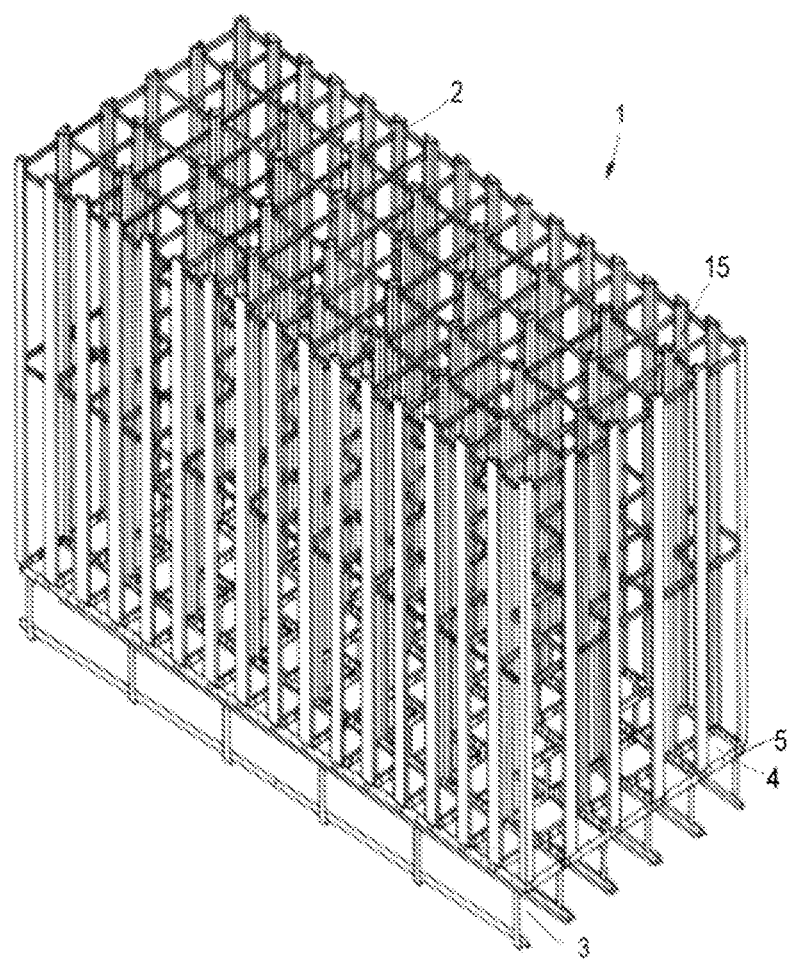
FIG. 1 illustrates a highly schematic representation of a block stacking arrangement.

FIG. 1 is a highly schematic representation of a block stacking arrangement 1 having a plurality of container stacking slots 2 and a loading space 3, which is arranged below the container stacking slots 2 in the direction of gravity.

Figure 2:
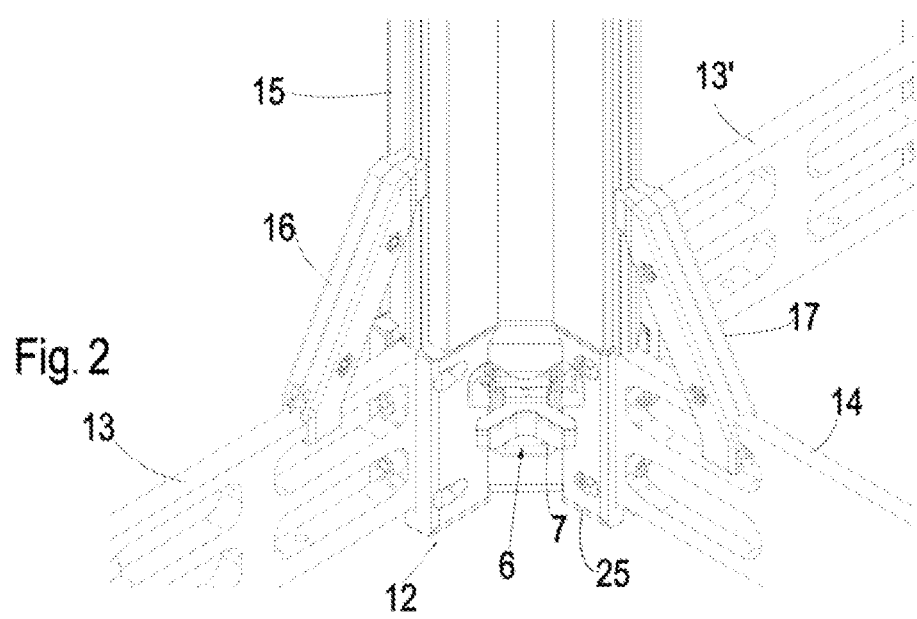
FIG. 2 illustrates a corner of a pass-through opening.
Figure 3:
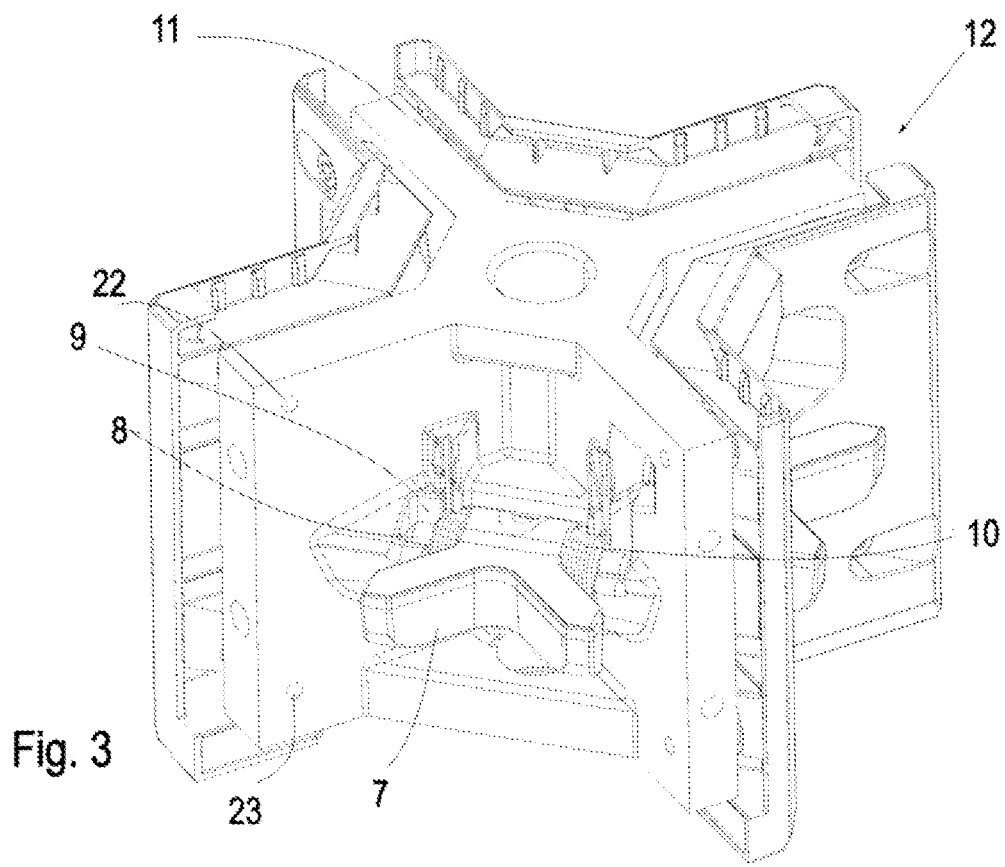
FIG. 3 illustrates the corner of the pass-through opening without a shaft hold-down device.

A pass-through opening 4 is arranged between the container stacking slot 2 and the loading space 3. The pass-through opening 4 is formed in a frame 5. The pass-through opening 4 has a holding device 6, which is shown in more detail in FIG. 2 for a corner, and has a flap (pawl) 7 that can be pivoted about a shaft 8 (FIG. 3). The shaft 8 is mounted in the frame 5 such that the flap 7 can be pivoted from a holding position shown in FIGS. 2, 3 and 5 into a release position in which flap 7 faces upwards in the direction of gravity.

The two ends of the shaft 8 are mounted in a bolt socket 9 that is upwardly open in the direction of gravity. The flap 7 is pretensioned by a spring 10 into the holding position. The spring 10 is designed as a coil spring arranged on the end of the shaft 8.

The bolt socket 9 is formed in a body 11 of an angle element 12 arranged at the corner of the pass-through opening. The angle element 12 connects a longitudinal member 13 and a cross-member 14. The longitudinal member 13 is arranged on a longitudinal side of the pass-through opening 4 and the cross-member 14 is arranged on a transverse side of the pass-through opening 4.

A post 15 is arranged on the angle element 12. The post 15 is connected to the longitudinal member 13 via a first strut arrangement 16 and to the cross-member 14 via a second strut arrangement 17. As can be seen in FIG. 2, a further longitudinal member 13' of an adjacent pass-through opening 4 is also arranged on the angle element 12.

Figure 4:
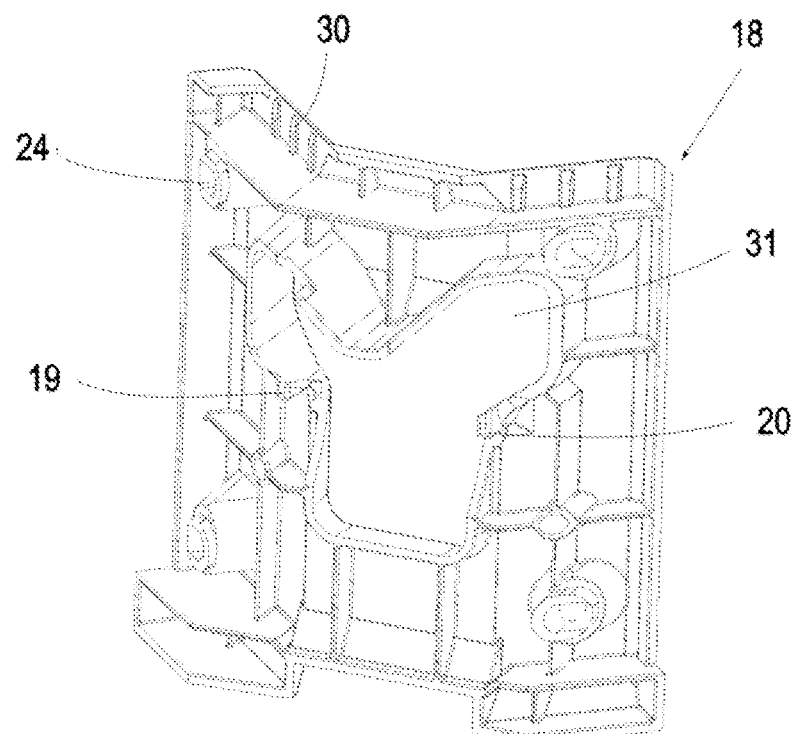
FIG. 4 illustrates a shaft hold-down device from its side facing away from the pass-through opening.

The flap 7 shown in FIG. 3 would, when contacted from below by a container, be pushed out of the bolt socket 9 that is upwardly open. In order to prevent this, a shaft hold-down device 18 is provided, which is shown in FIG. 4 from its side facing away from the pass-through opening 4. The shaft hold-down device 18 has two projections 19, 20 that, when the shaft hold-down device 18 is installed on the body 11, are arranged above the bolt socket 9 in the direction of gravity and act on the ends of the shaft 8. When the shaft hold-down device 18 is installed on the body 11, the shaft 8 of the flap 7 can thus no longer be pushed out of the bolt socket 9.

The shaft hold-down device 18 is fastened to the body 11 of the angle element 12 by four screws 21 (a different number of screws can also be provided). For this purpose, the body 11 has a plurality of screw holes 22, 23. For each screw, the shaft hold-down device 18 has a screw boss 24, which allows the shaft hold-down device 18 to be screwed to the body 11 without the shaft hold-down device 18 being tensioned, even in the case of a body 11 subject to tolerances, which can be designed, for example, as a cast part.

At its lower end in the direction of gravity, the shaft hold-down device 18 has an insertion bevel 25 that facilitates the insertion of a container through the pass-through opening 4. A corresponding insertion bevel can also be formed at the upper end in the direction of gravity.

The body 11 has a longitudinal extension 26, which is connected to the longitudinal member 13, and a transverse extension 27, which is connected to the cross-member 14. The shaft hold-down device 18 is connected both to the longitudinal extension 26 and to the transverse extension 27. The shaft hold-down device 18 therefore has two flanks 28, 29 that are oriented substantially at right angles to one another.

The angle element 12 has a positioning profile in a manner not shown in greater detail. The shaft hold-down device 18 has a matching counter-profile 30 such that the shaft hold-down device 18 can be repeatedly positioned very precisely on the body 11 of the angle element 12.

Figure 6:
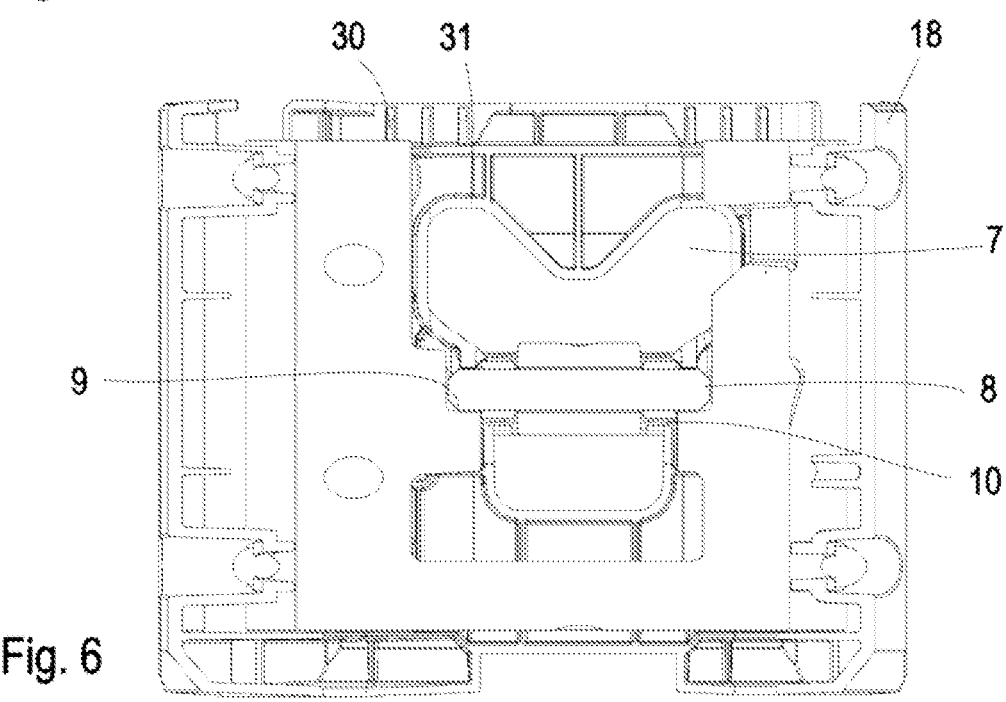
FIG. 6 illustrates a schematic representation for explaining the function of the shaft hold-down device.

The shaft hold-down device 18 has a recess 31 that is designed as a through-opening. The recess 31 is adapted to the shape of the flap 7. Thus, when the flap has been pivoted into the release position, as shown in FIG. 6, it largely fills the recess 31. The flap 7 then finishes with the side of the shaft hold-down device 18 facing the pass-through opening 4. In the release position, the flap 7 therefore does not project beyond the side of the shaft hold-down device 18 facing the pass-through opening 4 such that a container cannot get caught on the flap 7. The shaft hold-down device 18 forms a sliding surface with its side facing the pass-through opening 4, which sliding surface allows low-friction sliding of a container on the shaft hold-down device 18.

Figure 5:
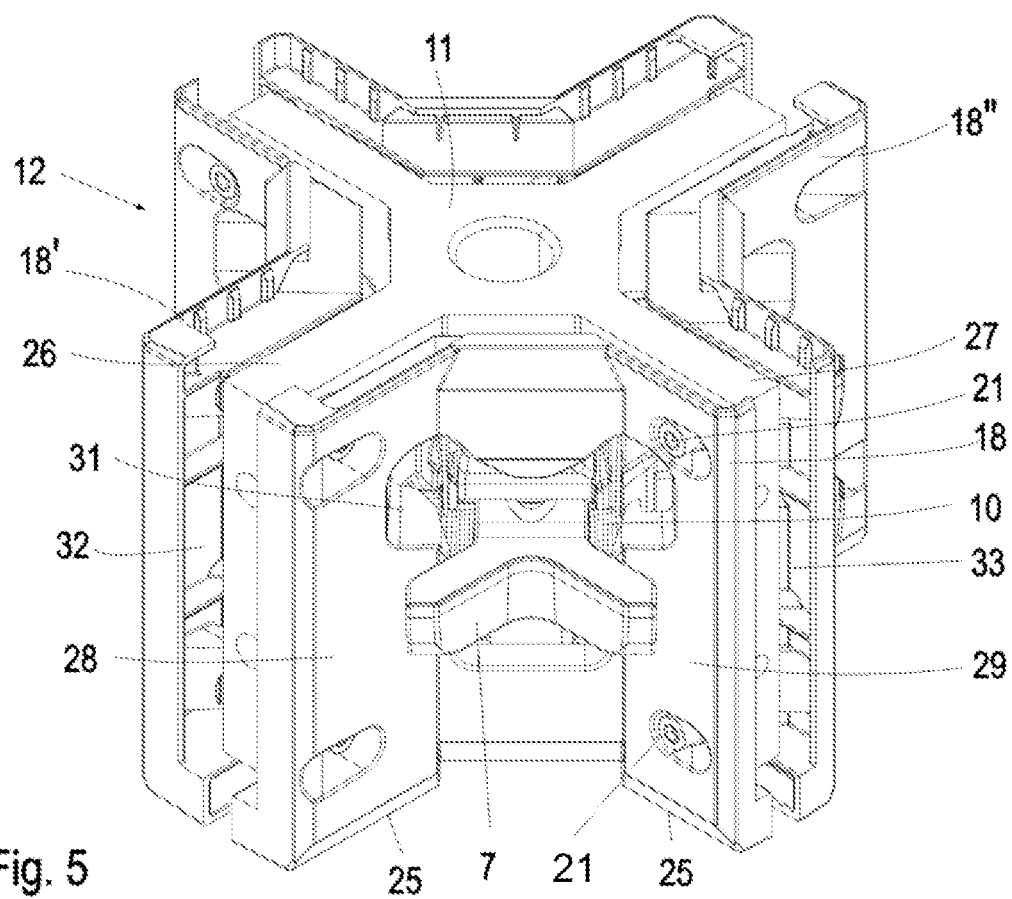
FIG. 5 illustrates an angle element with four shaft hold-down devices.

As can be seen in FIG. 5, the shaft hold-down device 18 projects not only over the longitudinal extension 26 in the direction of the longitudinal member 13 but also over the transverse extension 27 in the direction of the cross-member 14. Between two shaft hold-down devices 18, 18', which are arranged on both sides of the longitudinal extension 26, this results in a gap 32 that can be used for positioning the longitudinal member 13. In the same way, a gap 33, which can be used to position the cross-member 14, results between two shaft hold-down devices 18, 18" that are mounted on the transverse extension 27.

In the direction of gravity, the shaft hold-down device 18 has an extension with which it covers the angle element 12 and thus the frame 5 in the direction of gravity. When a container is inserted into a container stacking slot 2 or removed therefrom, the container thus does not come into contact with the frame 5. The frame 5 can thus be dimensioned exclusively with regard to its mechanical stability. The guidance of the container is handled by the shaft hold-down device 18.

The shaft hold-down device 18 is designed as a plastic element. The side facing the pass-through opening 4 can therefore be designed to be relatively smooth, which has a positive effect on the sliding properties of the sliding surface.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A block stacking arrangement comprising:
a plurality of container receiving slots;
a loading space arranged below the container receiving slots in a direction of gravity;
a pass-through opening between respective container receiving slots and the loading space; and
a holding device, which is arranged in the pass-through opening, having a flap pivotable about a shaft between a holding position and a release position,
wherein the shaft is mounted in an edge of the pass-through opening,
wherein the shaft is mounted at at least one end in a bolt socket that is upwardly open in the direction of gravity; and
further comprising a shaft hold-down device, which is fastened to the edge of the pass-through opening, arranged at least partially above the bolt socket in the direction of gravity to act on the end of the shaft.

2. The block stacking arrangement according to claim 1, wherein the edge of the pass-through opening in which the flap is mounted is in a corner of the pass-through opening between a longitudinal side and a transverse side of the pass-through opening, and the shaft hold-down device is connected both to the longitudinal side and to the transverse side.

3. The block stacking arrangement according to claim 2, wherein the shaft hold-down device is connected to the edge of the pass-through opening by screws.

4. The block stacking arrangement according to claim 3, wherein the shaft hold-down device has a screw boss facing the edge of the pass-through opening for each of the screws.

5. The block stacking arrangement according to claim 1, wherein the flap is pretensioned into the holding position by a spring.

6. The block stacking arrangement according to claim 5, wherein the spring is designed as a coil spring arranged on the end of the shaft.

7. The block stacking arrangement according to claim 1, wherein the pass-through opening has a positioning profile and the shaft hold-down device has a matching counter-profile.

8. The block stacking arrangement according to claim 1, wherein the shaft hold-down device is designed as a plastic element.

9. The block stacking arrangement according to claim 1, wherein the shaft hold-down device has an insertion bevel at its lower end in the direction of gravity.

10. The block stacking arrangement according to claim 1, wherein the pass-through opening is formed in a frame arranged between the container receiving slots and the loading space, wherein the shaft is mounted in the frame.

11. The block stacking arrangement according to claim 10, wherein the shaft hold-down device has an extension in the direction of gravity with which it covers the frame in the direction of gravity.

12. The block stacking arrangement according to claim 11, wherein the shaft hold-down device has a recess in which the flap is received in the release position.

13. The block stacking arrangement according to claim 10, wherein the shaft hold-down device forms a sliding surface on its side facing the pass-through opening.

14. The block stacking arrangement according to claim 1, wherein the frame has longitudinal members and cross-members, which are connected to one another by angle elements,
wherein the shaft hold-down device is fastened to one of the angle elements, and
wherein the shaft hold-down device projects beyond the angle element in the direction of at least one of the longitudinal member or the cross-member fastened to the angle element.

* * * * *